United States Patent [19]
Kaufman

[11] 3,855,896
[45] Dec. 24, 1974

[54] WEDGE ANCHOR

[75] Inventor: Bruce L. Kaufman, Trail Creek, Ind.

[73] Assignee: International Telephone and Telegraph Corporation, New York, N.Y.

[22] Filed: Sept. 14, 1973

[21] Appl. No.: 397,378

Related U.S. Application Data

[63] Continuation of Ser. No. 192,491, Oct. 26, 1971, abandoned, which is a continuation-in-part of Ser. No. 56,479, July 20, 1970, abandoned.

[52] U.S. Cl. ............................. 85/78, 85/85, 85/83
[51] Int. Cl. ...................................... F16b 13/06
[58] Field of Search ............... 85/77, 78, 75, 74, 73, 85/79, 72, 84, 83, 82, 85; 151/41.73, 41.74

[56] References Cited
UNITED STATES PATENTS

| | | | |
|---|---|---|---|
| 2,120,577 | 6/1938 | Schulte | 85/75 |
| 2,381,113 | 8/1945 | Cook | 85/75 |
| 2,756,624 | 7/1956 | Austin | 85/78 |
| 3,217,583 | 11/1965 | Fulop | 85/78 X |
| 3,277,770 | 10/1966 | McCulloch | 85/77 X |
| 3,448,651 | 6/1969 | Passer | 85/77 X |
| 3,460,429 | 8/1969 | La Torre | 85/78 |
| 3,523,482 | 8/1970 | Ploch | 85/73 |
| 3,551,015 | 12/1970 | Whiteside et al. | 85/37 X |
| 3,667,341 | 6/1972 | Kaplan | 85/77 |
| 3,750,526 | 8/1973 | Lerich | 85/79 |

FOREIGN PATENTS OR APPLICATIONS

| | | | |
|---|---|---|---|
| 1,435,507 | 3/1966 | France | 85/75 |
| 1,560,445 | 2/1969 | France | 85/75 |
| 445,206 | 2/1968 | Switzerland | 85/73 |

Primary Examiner—Ramon S. Britts
Attorney, Agent, or Firm—D. P. Warner; J. B. Raden

[57] ABSTRACT

The anchor is adapted to be inserted into concrete or masonary operates on a wedging principle and includes a split collar and an expansion bolt having a reduced diameter section between a threaded end and a conically tapered end. The collar is engaged over the reduced diameter portion and is urged onto the tapered end when the anchor is inserted into a predrilled hole and the bolt is taken up by a nut. Outward swaging or wedging of the collar as it is urged onto the tapered end is facilitated by providing a bevel on the inner edge of the one end of the collar engaging the tapered end and/or by providing a groove in the roller proximate the one end thereof. Increased wedging action is obtained by providing the tapered end of the bold with different tapers. Rotation of the collar is prevented by bumps on the collar engaging in the hole. Rotation of the bolt is prevented by knurled positions on the bolt engaging the collar and/or by the gripping engagement of the collar with the bolt by reason of the pressure exerted against the collar by the side wall of the hole. Increased pull out strength is achieved by having the widest diameter portion of the tapered end knurled such that it bites into the collar when it is urged thereagainst.

13 Claims, 7 Drawing Figures

PATENTED DEC 24 1974

Inventor
BRUCE L. KAUFMAN
BY
Silverman & Cass
ATTYS.

PATENTED DEC 24 1974

INVENTOR
BRUCE L. KAUFMAN

BY Silverman & Cass

ATTYS

WEDGE ANCHOR

RELATED PATENT APPLICATION

This application is a continuation of copending application Ser. No. 192,491 filed Oct. 26, 1971, now abandoned, which was a continuation-in-part of application Ser. No. 56,479, filed July 20, 1970, now abandoned.

BACKGROUND OF THE INVENTION 1. Field Of The Invention

The field of the invention is concrete anchors of the type known as wedge anchors or expansion bolt assemblies which are inserted into holes in concrete or masonry for securing a structural member thereto. The anchor includes a bolt which has a threaded end, a conical tapered or flared end, and a reduced diameter section between the ends thereof. A split collar is engaged around the reduced diameter section and rides up on the threaded end and is wedged against the side walls of the hole for resisting axial movement of the anchor when the bolt is taken up by a nut.

In use, the anchor is passed through a hole in the structural member and then into a hole drilled in concrete or masonry with a carbide bit whose diameter provides an interference fit with the anchor. Next the nut and a washer are received on the threaded end. As the nut is turned, the bolt moves axially out of the drilled hole, but relative to the collar which commences to ride up on the flared end of the bolt and against the side walls of the drilled hole. The collar remains stationary as the bolt moves axially relative to the collar. As the bolt moves, the end of the collar engaging the flared end is swaged radially outwardly of the bolt thus wedging the collar between the flared end of the bolt and the side walls of the drilled hole in the concrete or masonry to hold the anchor in place.

It is desirable to provide such anchors with: means for preventing relative rotation between the bolt and the collar; means for preventing rotation of the collar; means for increasing the pull-out strength of the anchor; and means for facilitating sliding of the collar relative to the tapered end of the bolt and for facilitating swaging or wedging of the collar radially outwardly from the axis of the bolt.

2. Description Of The Prior Art

Wedge anchors per se are well-known as exemplified by the various forms of wedge anchors disclosed in U.S. Pat. Nos.: 2,139,167; 2,667,037; 3,021,745; 3,277,770; and 3,448,651; French Pat. No. 1,435,507; and Swiss Pat. No. 445,206.

SUMMARY OF THE INVENTION

According to the invention, there is provided a wedge anchor including a split collar and an expansion bolt having a threaded section, a tapered section and a reduced diameter section between the threaded and tapered sections. The split collar is formed from an integral generally rectangular strip of metal and is engaged over or wrapped around the reduced diameter section. In the various embodiments of the wedge anchor of the invention to be described hereinafter; (a) the inner edge of the end of the collar which engages the tapered section of the bolt can be beveled in a coining operation to facilitate the riding up of the collar on the tapered section; (b) the tapered section can include at least two sections which have different tapers so that as the bolt moves axially of the collar, the collar is swaged outwardly at increased angles; (c) the largest diameter portion of the tapered section can be knurled so that it will bite into the collar urged thereupon to resist pull-out of the bolt from a hole and to assist in preventing relative rotation between the collar and bolt; (d) protuberances or bumps can be provided on the outer surface of the collar for engaging the side walls of a hole to prevent rotation of the collar; and (e) the collar can have a substantially annular groove proximate each end thereof, the groove at the end which rides up on the tapered section facilitating outward swaging of the end of the collar by providing a generally annular weakened area where bending occurs and the two grooves providing a symmetrical collar having ends which are mirror images of each other whereby no special orientation of the collar is necessary when mounting the collar on the bolt.

DESCRIPTION OF THE PREFERRED EMBODIMENTS

Figure 1:
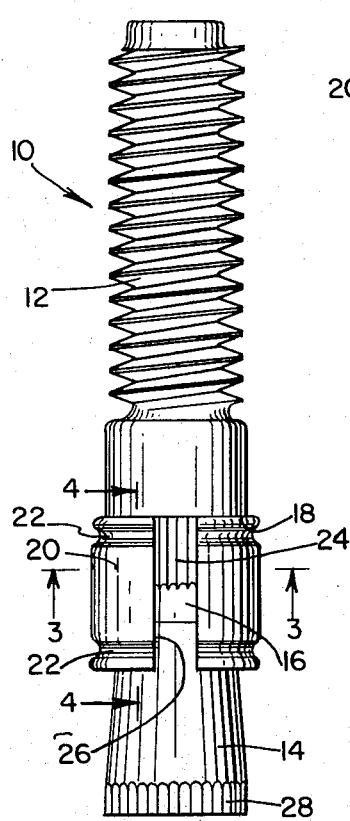
FIG. 1 is a side view of a wedge anchor constructed in accordance with the invention.

Referring now to FIG. 1, the reference numeral 10 designates the wedge anchor of the invention. The anchor 10 includes an expansion bolt or wedge stud 12 which has a threaded end of section 13 received through a structural member (not shown) and taken up by a suitable nut and washer (not shown) received on the threaded end 13.

To facilitate a description of the anchor 10, the threaded end 13 will be referred to as the top end of the bolt 12 and it will be understood that all references to top and bottom are relative.

Bottom end or section 14 of the bolt 12 is flared i.e., has a conical taper, and is connected to the threaded end 13 through an intervening reduced diameter cylindrical section 16 giving rise to an undercut shoulder 18. The anchor 10 also includes a split collar 20 which is engaged over the reduced diameter section 16. According to the teachings of the invention the collar 20 has an annular groove 22 which is proximate bottom edge 23 of the collar 20 and which facilitates setting of the anchor 10. Specifically, the groove 22 provides a reduced thickness annular section adjacent the bottom edge 23 of the collar 20. This annular section is, of course, weaker than the adjacent portions of the collar and provides a bend line, much like a fold or score line on a paperboard blank, so that when the bottom end of the collar 20 is urged against and rides up on the flared end 14 of the bolt 12, it is easily bent or swagged radially outwardly from the axis of the bolt 12 with the bottom end of the collar 20 bending at the groove 22.

Preferably, and as shown, the collar 20 has two grooves 22, the second groove being proximate or adjacent to the top edge of the collar 20. As a result, the ends of the collar 20 are mirror images of each other and no special orientation of the collar 20 is required when it is mounted on or wrapped around the bolt 12. Either end will function in the same manner. Accordingly, assembly of the wedge anchor 10 is simplified by thus forming the collar with the configuration just described.

Figure 3:
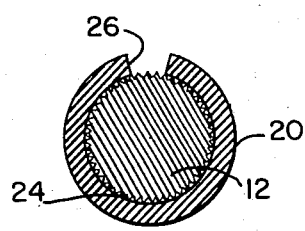
FIG. 3 is a sectional view taken along the line 3—3 of FIG. 1 and in the indicated direction.
Figure 4:
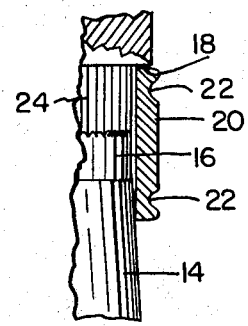
FIG. 4 is a fragmentary sectional view taken along the line 4—4 of FIG. 1 and in the indicated direction.

In the embodiment of the wedge anchor shown in FIGS. 1, 3 and 4, an annular ring 24 of knurling is provided on the reduced diameter sections 16 adjacent the shoulder 18, the knurling 24 preferably being formed of axial grooves as shown in FIG. 1 through the split 26 and the collar 20. This knurling 24 engages the collar 20 to prevent relative rotation between the collar 20 and the bolt 12 when the anchor 10 is being taken up by rotation of a nut, but not to inhibit axial movement of the reduced diameter section 16 relative to the collar 20. In so taking up the anchor 10, the collar 20 rides downward relative to the reduced diameter section 16, rides up on the tapered end or section 14 and commences to expand. Its leading (bottom) edge 23 scrapes the surface of the conical tapered end or section 14; however, with the bottom groove 22 providing a line of weakness around the collar 20 the edge 23 does not dig into the tapered end 14. Rather it bends radially outwardly while it rides up on the tapered end 14. When it finally reaches the bottom of the tapered end or section 14 it engages the largest diameter portion of the tapered end 14 which, preferably, is knurled as shown at 28. The knurling 28 will bite into the collar 20 to increase pull-out strength of the anchor 10 and to assist in preventing relative rotation between the bolt 12 and the collar 20.

Figure 2:
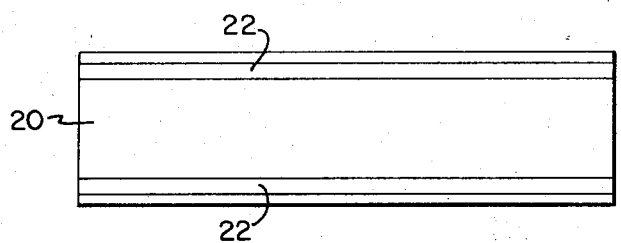
FIG. 2 is a plan view of a metal strip before it is formed into the collar of the wedge anchor.

The collar 20 is preferably made from a metal strip and at an intermediate stage in the formation of the collar 20 it is flat as shown in FIG. 2. The grooves 22 are preferably formed in the flat strip 30 by a stamping operation. It is to be noted that the collar 20 is of one piece construction with continuous top and bottom edges interrupted only by the split 26. In other words it is not adapted to be separated into sections by having longitudinal slits formed therein opposite the split 26 as is the case in some previously proposed wedge anchor constructions.

Figure 5:
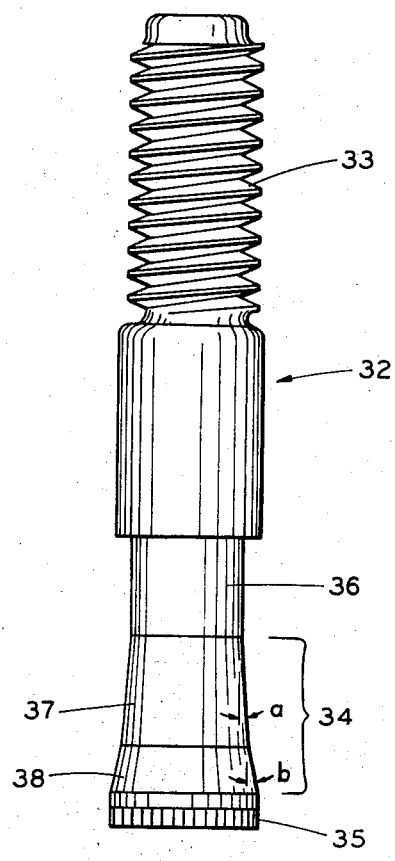
FIG. 5 is a side view of another form of expansion bolt used in the wedge anchor of the invention.

In assembling the anchor 20, the strip 30 is formed or wrapped around the section 16 in a suitable fixture to form the collar 20 as shown in FIGS. 1, 3 and 4. When so assembled the anchor 10 is designed to have a slight interference fit with a predrilled hole into which it is to be inserted and set. Turning now to FIG. 5, another form of bolt for use in the anchor 10 is shown at 32. Much like the bolt 12, the bolt 32 has a threaded end or section 33, a flared or tapered section or end 34 with the largest diameter portion 35 thereof knurled, and a reduced diameter section 36 therebetween. The tapered end 34 however, is divided into two sections 37 and 38 which have different tapers (angles of taper $a$ and $b$) so that as the collar 20 rides up on the tapered end 34 it is swaged or wedged outwardly at increased angles. By having at least two tapered sections 37 and 38, the bolt 32 provides for an increase in wedging action as the leading edge 23 of the collar 20 engages the second tapered section 38. Of course, if desired, the bolt 32 may have more than two tapered sections.

By having multiple tapers on the flared end 34, the desired amount of wedging can be accomplished with a shorter axial displacement of the bolt 32. This means that the wedge anchor can be set in place faster and with fewer turns of the nut on the bolt 32 than would be the case with the bolt 12 which has only one taper on the flared end 14 thereof.

Figure 6:
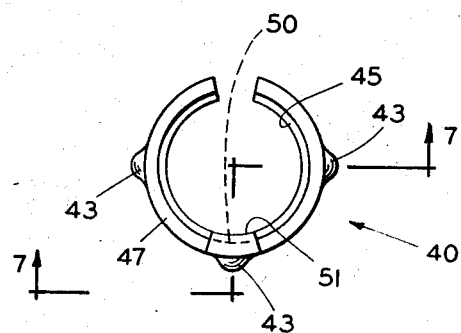
FIG. 6 is an end view of another form of collar used in the wedge anchor of the invention; and, FIG. 7 is a side view of the collar shown in FIG. 6 with portions broken away taken along line 7—7 of FIG. 6 and in the indicated direction.
Figure 7:
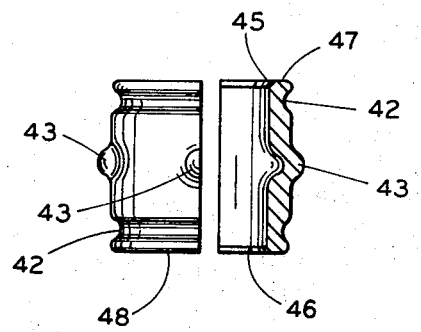

Another form of collar for use in the anchor 10 is shown at 40 in FIGS. 6 and 7. The collar 40 has two annular grooves 42 which are essentially identical to the grooves 22 in the collar 20 and which are provided for the same purpose. Additionally, the collar 40 has at least one bump or proturberance 43 protruding from the periphery thereof. In the illustrated embodiment, the collar 40 has three bumps 43. These bumps 43 are easily formed into each collar when it is being cut and formed from a larger strip of metal such as by combined stamping and cutting operations.

The bumps 43 are adapted to engage and wedge into the side wall of a drilled hole (when the anchor is set therein) for the purpose of preventing rotation of the collar 40.

The forming of the bumps 43 cold works the metal of the collar so as to harden it, giving the bumps a spring steel texture which strongly resists deformation when the bumps 43 are wedged against the side wall of a drilled hole.

Also, the bumps 43 provide a greater interference fit when the wedge anchor is inserted into the hole. This results in a greater pressing or clamping of the collar 40 against the reduced diameter section 16 or 36 such that the collar 40 grips the bolt 12 or 32 more strongly. This stronger gripping of the bolt 12 or 32 inhibits if not prevents relative rotation between the bolt 12 or 32 and the collar 40 to an extent where the knurling 24 on the reduced diameter section 16 can be eliminated, the clamping or pressing of the collar 40 against the bolt 12 or 32 when it is inserted into a hole then providing the sole means for preventing relative rotation between the bolt 12 or 32 and the collar 40.

Preferably, and as best shown in FIG. 7 inner edges 45 and 46 at each end 47 and 48 of the collar 40 are coined. That is is to say they are formed with a bevel. The beveled edges 45 and 46 facilitate sliding movement of the end 47 or 48 on the bolt 12 or 32 as the edge 45 or 46 is urged against the flared end 14 or 34 during setting of the anchor 10. Also the coining removes burrs on the inner edges of the collar 40 which might impede the wedging action by galling or gouging into the tapered end 14 or 34.

The collar 40 is preferably formed from strip stock in a progressive die. The stock is fed into the die and collars are progressively formed by successive stamping operations which form the grooves 42, the bumps 42 and the coined edges 45 and 46. To properly locate the stock while these operations are being performed, each strip portion which is formed into a collar is initially formed with laterally extending gripping tabs which are cut off before the collar is ejected from the mold with an expanded C-shape. As a result, a portion of each edge 45, 46, where the tab was connected to the strip portion is flat as shown in FIG. 6 by the flat 49 on the end 47 of the collar 40. The flat 49 is formed when one of the tabs is cut from the strip.

However, prior to the cutting of the tabs, the portions of the collar adjacent thereto are deformed outwardly of the collar a slight amount, such that the inner surface of the collar adjacent each flat 49 is somewhat depressed as indicated by the hiddenline 50. Consequently, when the tabs are cut off only a thin edge 51 is formed which does not extend inwardly beyond the inner diameter of the collar 40 and which provides very little if any resistance to the wedging action.

From the foregoing description of the preferred embodiments of the wedge anchor of the present invention, it will be obvious to those skilled in the art that various modifications and variations can be made to the wedge anchor of the present invention without departing from the spirit or scope of the invention. Accordingly, the scope of the invention is only to be limited as necessitated by the accompanying claims.

What is desired to secure by Letters Patent of the United States is:

1. A wedge anchor of a type adapted to be expanded in a predrilled hole in concrete or the like, the hole being substantially the same diameter as said anchor and said anchor fitting into the hole to be expanded therein, said anchor comprising an expansion bolt having a first section formed on a first end of the bolt, said first section including means for enabling a longitudinal force which tends to urge said bolt from the hole to be applied to said bolt, a second section formed on the bolt adjacent to the first section, said second section forming a substantially cylindrical surface coextensive with the surface of the bolt, a tapered section, a reduced diameter section between said second section and said tapered section, a one-piece split expansion collar, said split expansion collar including an integral split ring formed from a substantially rectantular, imperforate strip of metal and being positioned around said reduced diameter section, said collar having a generally annular groove defining an area of minimum thickness in cross-section proximate each axial end thereof, said groove at the axial end which rides upon the said tapered section facilitating outward swaging of the said axial end of said collar by providing a generally annular weakened area where bending occurs, said annular grooves providing a substantially symmetrical collar having axial ends which are substantially mirror images of each other whereby no particular orientation of said collar is necessary when mounting said collar on said bolt, the inner edges at each axial end of said collar including bevels which provide smooth tapers substantially about said inner edges thereby to inhibit gouging of said tapered section by said collar, said collar including at least two spaced protuberances on the outer surface thereof and extending outwardly therefrom which are adapted to engage and bear into the side wall of the hole when said bolt is moved axially of said collar to swage said collar outwardly of said bolt, said protuberances enabling a better fit between the hole and said collar and inhibiting rotation between said collar and said hole, said tapered section extending between said reduced diameter section and a second end of said expansion bolt, and a third section of said expansion bolt formed adjacent the second end of said bolt, said third section including a knurled surface fitting inside the collar as the collar swages outwardly to help hold the anchor in the hole and to help prevent rotation of said anchor in the hole.

2. The wedge anchor as claimed in claim 1 wherein said two spaced protuberances on the outer surface of said collar are oriented so that said collar is strongly pressed against said bolt and frictionally grasps said bolt with a gripping force sufficient to inhibit, if not prevent relative rotation between said collar and said bolt.

3. A wedge anchor of the type adapted to be expanded in a predrilled hole in concrete or the like, the hole being substantially the same diameter as said anchor and said anchor fitting into the hole before it is expanded therein, said anchor comprising an expansion bolt having a first section including means for enabling a longitudinal force which tends to urge said bolt from the hole to be applied to said bolt, a tapered section, a reduced diameter section between said first and tapered sections, a one-piece split expansion collar, said split expansion collar including an integral split ring formed from a generally rectangular, imperforate strip of metal said collar being positioned around said reduced diameter section, said tapered section including at least a first section and a second section having different tapers so that as said collar is urged against said tapered section, it is initially swaged outwardly of said bolt at a first angle by said first section and then upon engaging said second section, said collar is swaged outwardly at a second, increased angle to provide an abrupt increase in the wedging action whereby less axial movement of said bolt is required to set said anchor in place than is required with a tapered section having a single taper, said tapered section extending between said reduced diameter section and one end of said expansion bolt, the largest diameter portion of said tapered section having an irregular surface which will engage and bite into the inner surface of said collar when said collar is urged upon said tapered section during expansion of said anchor and said engagement between said irregular surface and said inner surface of said collar serving to inhibit, if not prevent, pull-out of said bolt from the hole in addition to inhibiting, if not preventing, relative rotation between said bolt and said collar, said collar having a generally annular groove defining an area of minimum thickness in cross section proximate each axial end thereof, said groove at the axial end which rides up on said tapered section upon axial movement of said bolt facilitating outward swaging of said axial end of said collar by providing a generally annular weakened area where bending occurs, and said two grooves providing a substantially symmetrical collar having axial ends which are mirror images of each other whereby no particular orientation of said collar is necessary when mounting said collar on said bolt.

4. The wedge anchor as claimed in claim 3, wherein the inner edges at each axial end of said collar are beveled on said inner edges to provide smooth tapers free of burrs substantially about said inner edges thereby to inhibit, if not prevent, gouging of said tapered sections by said collar and to facilitate a smooth sliding engagement between one axial end of said collar and said tapered sections when said bolt is moved axially of said collar.

5. The wedge anchor as claimed in claim 3, wherein said collar has at least two spaced protuberances on the outer surface thereof which are adapted to engage and bear into the side wall of the hole when said bolt is moved axially of said collar to swage said collar outwardly of said bolt, said protuberances also serving to create a better fit between the hole and said anchor than would be the case without said protuberances such that said collar is more strongly pressed against said bolt and frictionally grips said bolt with a gripping force sufficient to inhibit, if not prevent, relative rotation between said collar and said bolt.

6. A wedge anchor of the type adapted to be expanded in a predrilled hole in concrete or the like, the hole being substantially the same diameter as said anchor and said anchor making at least a slight interference fit with the hole before it is expanded therein, said anchor comprising an expansion bolt having a first section including means for enabling a longitudinal force which tends to urge said bolt from the hole to be applied to said bolt, a tapered section and a reduced diameter section between said first and tapered sections, a one-piece split expansion collar, said split expansion collar including an integral split ring formed from a generally rectangular, imperforate strip of metal, said collar being positioned around said reduced diameter section, said collar having a generally annular groove defining an area of minimum thickness in cross-section proximate each axial end thereof, said groove at the axial end which rides upon said tapered section upon axial movement of said bolt facilitating outward swaging of the said axial end of said collar by providing a generally annular weakened area where bending occurs and said two grooves providing a substantially symmetrical collar having axial ends which are mirror images of each other whereby no particular orientation of said collar is necessary when mounting said collar on said bolt, the inner edges at each axial end of said collar including bevels providing smooth tapers substantially about said inner edges thereby to inhibit, if not prevent, gouging of said tapered section by said collar and to facilitate a smooth sliding engagement between the one axial end of said collar and said tapered section when said bolt is moved axially of said collar.

7. The wedge anchor as claimed in claim 6 wherein the inner edges at each axial end of said collar are beveled free of burrs on said inner edges to provide smooth tapers substantially about said inner edges.

8. The wedge anchor as claimed in claim 6 wherein said collar has at least two protuberances on the outer surface thereof which are adapted to engage and bear into the side wall of the hole when said bolt is moved axially of said collar to swage said collar outwardly of said bolt, said protuberances also serving to create a greater interference fit between the hole and said anchor than would be the case without said protuberances such that said collar is more strongly pressed against said bolt and frictionally grips said bolt with a gripping force sufficient to inhibit, if not prevent, relative rotation between said collar and said bolt.

9. A wedge anchor of the type adapted to be expanded in a predrilled hole in concrete or the like, the hole being substantially the same diameter as said anchor and said anchor making at least a slight interference fit with the hole before it is expanded therein, said anchor comprising an expansion bolt having a first section including means for enabling a longitudinal force which tends to urge said bolt from the hole to be applied to said bolt, a tapered section and a reduced diameter section between said first and tapered sections, and a one-piece split expansion collar, said split expansion collar including an integral split ring formed from a generally rectangular, imperforate strip of metal, said collar being positioned around said reduced diameter section, said collar having at least two spaced protuberances on the outer surface thereof which are adapted to engage and bear into the side wall of the hole when said bolt is moved axially of said collar to swage said collar outwardly of said bolt, said protuberances also serving to create a closer interference fit between the hole and said anchor than would be the case without said protuberances such that said collar is more strongly pressed against said bolt and frictionally grips said bolt with a gripping force sufficient to inhibit, if not prevent, relative rotation between said collar and said bolt, said collar having a substantially annular groove defining an area of minimum thickness in cross-section proximate each axial end of said collar so that as the collar rides upon the tapered section it is swaged outwardly about the line of weakness formed by one of said annular grooves, the inner edges at each axial end of said collar being beveled to remove substantially all of the burrs on said inner edges to provide smooth tapers substantially about said inner edges thereby to inhibit, if not prevent, gouging of said tapered section and to facilitate by said collar a smooth sliding engagement between one axial end of said collar and said tapered section when said bolt is moved axially of said collar.

10. A wedge anchor of the type adapted to be expanded in a predrilled hole in concrete or the like, the hole being substantially the same diameter as said anchor and said anchor making at least a slight interference fit with the hole before it is expanded therein, said anchor comprising an expansion bolt having a first section including means for enabling a longitudinal force which tends to urge said bolt from the hole to be applied to said bolt, a tapered section and a reduced diameter section between said first section and a reduced diameter section between said first and tapered sections, and a one-piece split expansion collar, said split expansion collar including an integral split ring formed from a generally rectangular, imperforate strip of metal, said collar being positioned around said reduced diameter section, said tapered section extending between said reduced diameter section and one end of said expansion bolt, the longest diameter portion of said tapered section having an irregular or knurled surface which will engage and bite into the inner surface of said collar when said collar is urged upon said tapered section during expansion of said anchor and said engagement between said irregular surface and said inner surface of said collar serving to inhibit, if not prevent, pull-out of said bolt from the hole in addition to inhibiting, if not preventing, relative rotation between said bolt and said collar, said tapered section including at least a first section and a second section which have different tapers so that as said collar is urged against said tapered section, it is initially swaged outwardly of said bolt at first angle by said first section and then, upon engaging said second section, said collar is swaged outwardly at a second, increased angle, to provide an abrupt increase in the wedging action whereby less axial movement of said bolt is required to set said anchor in place then is required with a tapered section having a single taper, said collar having at least two spaced proturberances on the outer surface thereof which are adapted to engage and bear into the side wall of the hole when said bolt is moved axially of said collar to swage said collar outwardly of said bolt, said protuberances also serving to create a greater interference fit between the hole and said anchor than would be the case without said protuberances such that said collar is more strongly pressed against said bolt and frictionally grips said bolt with a gripping force sufficient to inhibit, it not prevent, relative rotation between said collar and said bolt, said collar having a generally annular groove defining an area of minimum thickness in cross-section proximate each axial end thereof, said groove at the axial end which rides up on said tapered section facilitating outward swaging of the said axial end of said collar by providing a generally annular weakened area where bending occurs and said two grooves providing a substantially symmetrical collar having axial ends which are substantially mirror images of each other whereby no particular orientation of said collar is necessary when mounting said collar on said bolt, and the inner edges at each axial end of said collar including bevels which provide smooth tapers substantially about said inner edges thereby to inhibit, if not prevent, gouging of said tapered section by said collar and to facilitate a smooth sliding engagement between one said tapered section when said bolt is moved axially of said collar.

11. A wedge anchor of a type adapted to be expanded in a predrilled hole in concrete or the like, the hole being substantially the same diameter as said anchor and said anchor making at least a slight interference fit with the hole, said anchor comprising:
   A. an integral elongate body having
      i. a threaded section along a substantial length thereof comprising the outer portion of said body and at least a part of said threaded section adapted to protrude from the hole,
      ii. an unthreaded section adjacent said threaded section inwardly thereof and having its diameter substantially the same as the maximum diameter of said anchor,
      iii. a cylindrical section adjacent said unthreaded section and inwardly thereof and of a diameter substantially less than that of said unthreaded section, an annular ring of knurling provided on said cylindrical section, and
      iv. a conical tapered section extending from said cylindrical section to the innermost end of said body, the smallest diameter of said conical section being the same as that of said cylindrical section and being connected thereto, and the largest diameter of said conical section being substantially the same as that of the said unthreaded section, and
   B. a split one-piece collar engaged on said cylindrical section, said collar
      i. being formed from a substantially rectangular, imperforate strip of metal which is enwrapped about said cylindrical section with the juxtaposed ends thereof slightly spaced apart,
      ii. having a protuberance extending outward from the center of the collar to engage and wedge into the side of a drilled hole,
      iii. having an axial length which is greater than the axial length of said cylindrical section such that when said metal strip is enwrapped about said cylindrical section to form said collar as a cylindrical split sleeve or ring from a single slit, one end of said collar engages against said shoulder and the other end extends well onto said conical section, and
      iv. having a substantially annular groove defining an area of minimum thickness in cross-section proximate each axial end of said collar
   said split collar being adapted to expand and ride up on said tapered section when said anchor body is moved axially out of the hole, such as when said anchor body is taken up by a nut received on said threaded section and said collar is swaged into engagement with the side wall of the hole by bending about an annular weakened area provided by said grooves.

12. The wedge anchor as claimed in claim 11, wherein a ring of knurling is provided on the widest diameter portion of the tapered section.

13. The wedge anchor as claimed in claim 11, wherein the tapered section is divided into two sections which have different tapers so that as the collar rides up on the tapered end it is swaged outwardly at increased angles.

* * * * *